United States Patent [19]

Jackson

[11] Patent Number: 4,794,384
[45] Date of Patent: Dec. 27, 1988

[54] OPTICAL TRANSLATOR DEVICE
[75] Inventor: Stephen B. Jackson, La Honda, Calif.
[73] Assignee: Xerox Corporation, Stamford, Conn.
[21] Appl. No.: 37,094
[22] Filed: Apr. 9, 1987

Related U.S. Application Data

[63] Continuation of Ser. No. 655,138, Sep. 27, 1984, abandoned.

[51] Int. Cl.$^4$ .............................................. G09G 3/02
[52] U.S. Cl. ..................................... 340/710; 340/709
[58] Field of Search .................. 340/710, 706, 709; 178/18; 356/28; 382/18, 28; 235/460; 250/221

[56] References Cited

U.S. PATENT DOCUMENTS

| | | | |
|---|---|---|---|
| 3,304,434 | 2/1967 | Koster | 250/231 |
| 3,541,541 | 11/1970 | Engelbart | 340/710 |
| 3,835,464 | 9/1974 | Rider | 340/710 |
| 3,892,963 | 7/1975 | Hawley et al. | 250/231 R |
| 3,987,685 | 10/1976 | Opocensky | 74/471 R |
| 4,162,509 | 7/1979 | Robertson | 356/28 |
| 4,260,979 | 4/1981 | Smith | 382/59 |
| 4,311,383 | 1/1982 | Ohtsubo | 356/28.5 |
| 4,339,954 | 7/1982 | Anson et al. | 73/657 |
| 4,364,035 | 12/1982 | Kirsch | 340/710 |
| 4,390,873 | 6/1983 | Kirsch | 340/710 |
| 4,521,772 | 6/1985 | Lyon | 340/710 |
| 4,521,773 | 6/1985 | Lyon | 340/710 |
| 4,631,400 | 12/1986 | Tanner et al. | 340/706 |

OTHER PUBLICATIONS

Sakaguchi et al., "The Hologram Tablet-A New Graphic Input Device", AFIPS Conference Proceedings, vol. 37, 1970.

Primary Examiner—John W. Caldwell, Sr.
Assistant Examiner—Tyrone Queen
Attorney, Agent, or Firm—W. Douglas Carothers, Jr.

[57] ABSTRACT

An optical translator device capable of providing information indicative of the amount and direction of relative movement between the device and a surface positioned relative thereto. The device comprises a light source for providing at least partially coherent radiation and the source radiation is directed toward an area of the surface area. The reflected coherent radiation or light at the surface area undergoes optical interference due to the texture of the surface thereby forming a speckle pattern consisting of light and dark features. A detector array at the device comprises a plurality of photodetector cells and positioned in the path to receive the reflected light and to detect the light and dark features as represented by the cells in the array detecting light features in the reflected light thereby representative of a sample of the speckle pattern. Means is provided to compare consecutively produced samples which are indicative of the translatory information. A particular application of the optical translator device is a novel optical cursor control device which derives its translatory information from movement on substantially any sufficiently reflective surface. The output of the detector array is provided to circuit means to produce signals indicative of the amount and direction of relative cursor control device movement over the surface based upon observation of changes and movement of the speckle pattern as presented to the detector array. Such a device can be characterized as a "padless optical mouse" to provide orthogonal signals to move a cursor from position to position on a display screen in response to movement of the mouse over any sufficiently reflective surface, such as a desk top.

15 Claims, 3 Drawing Sheets

TO & FROM FIG. 3B

OPTICAL TRANSLATOR DEVICE

This is a continuation of application Ser. No. 655,138, filed 9/27/84 now abandoned.

BACKGROUND OF THE INVENTION

This invention relates to an optical translator device capable of providing information indicative of the amount and direction of relative movement between said device and a surface positioned relative thereto and more particularly, as an example thereof, to an optical cursor control device or "optical mouse" for use with an interactive display oriented computer system to provide movement for a visible cursor from position to position on a display screen of such a system.

Over the past several decades, functional control devices have been designed and developed for use, for example, with computer display systems. These devices have taken on several forms, such as joy sticks, light pens, touch panels and hand held cursor control devices, now also referred to as a "mouse".

The mouse is a pointing device used with interactive display oriented computer systems, particularly to control the cursor on the system display. The mouse tracks the movement of a user's hand as the user moves the mouse about on a work surface or surface pad usually next to the user's keyboard input to the system. Microswitches may be positioned on the top surface of the housing of the mouse to perform various functions in the system upon finger operation of a switch selected by the user. The mouse device has recently become readily available in the office products market beginning in 1981 as a part of the 8010 Professional Workstation, developed, manufactured and distributed by Xerox Corporation.

Research over a period of time has led many to conclude that the mouse concept is the preferred and best means for performing cursor function controls, some of the reasons being its adaptability for use in conjunction with a keyboard input of such systems from a human engineering standpoint and ease of display cursor movement with desired functions implemented by microswitches present on the mouse. These cursor control devices or "mice" have been known of electromechanical design. Examples of such devices may be found in U.S. Pat. Nos. 3,304,434; 3,541,541; 3,835,464; 3,892,963 and 3,987,685.

The best known electromechanical and "grandfather" mouse was developed at Stanford Research Institute and is disclosed in U.S. Pat. No. 3,541,541. This mouse employs a pair of wheels that turn potentiometer shafts to encode X and Y motion into analog signals. Each wheel turns as the mouse is moved along its respective coordinate direction and slips sideways as the mouse is moved in an orthogonal direction. When the mouse is moved diagonally, both wheels turn and slip simultaneously. The design of this mouse led to the use of ball bearings as wheels and optical shaft encoders to generate a two bit quadrature signaling code, as disclosed in U.S. Pat. No. 3,892,963. The motion of a wheel caused a two bit output for a coordinate direction to form square waves in quadrature, with phase and frequency determined the direction and speed of travel. Each bit transition represented motion of one resolvable step which was employed to move the cursor on the display screen. Further development led to the employment of a ball or sphere instead of two wheels for more uniform tracking (U.S. Pat. Nos. 3,835,464 and 3,987,685). Internally, the sphere itself was a trackball with shafts turning against the ball and with commutation as shaft encoders or optical disc encoders, the latter being disclosed in U.S. Pat. No. 3,304,434.

While these mice have proved to be quite useful in performing display functions, they have not been outstandingly reliable, particularly over long periods of use. For example, the mechanical moving parts of the mouse, such as the balls and wheels become dirty and slip on the work surface or pad, rather than provide continuous rolling action, or the commutators of the mouse become dirty and skip over engaging surfaces.

Also, because of the precision and tolerances necessary for the mechanical moving parts and the number of parts involved, these mechanical mice have been expensive to fabricate.

Recently, fully optically implemented cursor control devices have come into use. Examples of such devices are found in U.S. patent application Ser. No. 457,805 filed Jan. 1, 1983, now U.S. Pat. No. 4,521,772 and U.S. Pat. Nos. 4,364,035 and 4,390,873. These devices are characterized by having no moving parts and optically detect motion relative to the mouse body by means of detecting contrasting markings or specially prepared patterns on a flat surface over which the mouse body is translated. What would be better is to have an optical cursor control device that does not need contrasting markings or other specially prepared optical pattern in order for the device to functionally operate as a cursor control for display oriented computer systems.

SUMMARY OF THE INVENTION

According to this invention, an optical translator device capable of providing information indicative of the amount and direction of relative movement between the device and a surface positioned relative thereto. The device comprises a light source for providing at least partially coherent radiation and the source radiation is directed toward an area of the surface area. The reflected coherent radiation or light at the surface area undergoes optical interference due to the texture of the surface thereby forming a speckle pattern consisting of light and dark features. A detector array at the device comprises a plurality of photodetector cells and positioned in the path to receive the reflected light and to detect the light and dark features as represented by the cells in the array detecting light features in the reflected light thereby representative of a sample of the speckle pattern. Means is provided to compare consecutively produced samples which are indicative of the translatory information.

A particular application of the optical translator device is a novel optical cursor control device which derives its translatory information from movement on substantially any sufficiently reflective surface. Changes in the speckle pattern of back scattered coherent light, provided by a coherent light source in the cursor control device, reflected from such a surface is detected by an array of photodetectors. The output of the detector array is provided to circuit means to produce signals indicative of the amount and direction of relative cursor control device movement over the surface based upon observation of changes and movement of the speckle pattern as presented to the detector array. Such a device can be characterized as a "padless optical mouse" to provide orthogonal signals to move a cursor from position to position on a display screen in response to movement of the mouse over any sufficiently reflective surface, such as a desk top. Thus, special contrasting markings or special patterns are not necessary as in the case of previously known optical mice.

As previously indicated, the radiation from the source at the cursor control device is directed toward an area of the surface wherein a portion of the light is reflected from the surface area to a detector array. The reflected coherent radiation or light undergoes optical interference due to the texture or irregularity of the surface thereby forming a speckle pattern comprising light and dark features. The detector array comprises a plurality of photodetector elements or cells that are permitted to detect light features of the pattern within a dynamically determined period of time. The read out of the detected values from the array is a representation of a sample of the speckle pattern. Comparison of a prepared and valid sample with a previously determined valid sample provides data indicative of the amount and direction of such relative movement of the device over the surface. Comparison and movemental signal development are provided by circuit means coupled to the detector array. The circuit means also provides a determination of the number of detector cells in the array that have detected light features and compares these numbers with a predetermined value indicative of whether the sample is a good representation of the speckle pattern before being declared as an acceptable or valid sample.

Other objects and attainments together with a fuller understanding of the invention will become apparent and appreciated by referring to the following description and claims taken in conjunction with the accompanying drawings.

DESCRIPTION OF THE PREFERRED EMBODIMENT

Reference is now made to the drawings wherein an exemplary embodiment is described relative to an optical cursor control device. However, as would be realized by those skilled in this art, the principals of this invention may be utilized in other applications for the purpose of detecting translatory motion utilizing the optical speckle pattern technique disclosed herein, such as, for example, paper path movement in an electrostatic printer/plotter.

Figure 1:
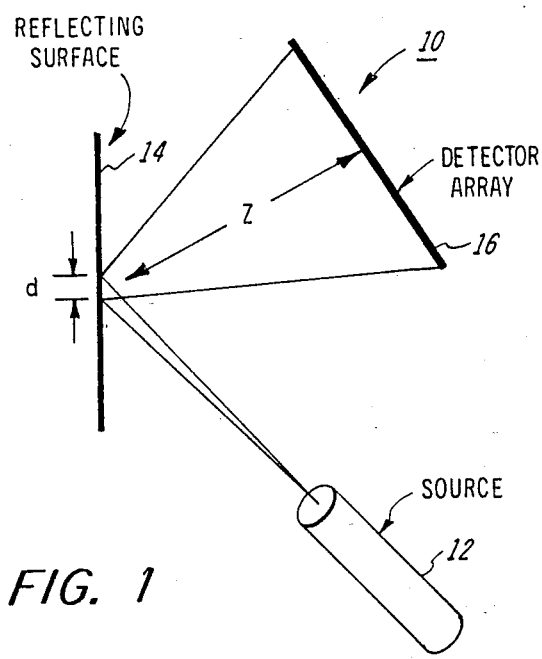
FIG. 1 is a diagrammatic view of the principle of operation of this invention.

Referring now to FIG. 1, the basic components of the optical cursor control device 10 of this invention are a light source 12 of coherent radiation or at least partially coherent radiation, a reflecting surface 14, a detector array 16 and circuit means (FIGS. 3A and 3B) to process the data signals developed from the detector array to determine a valid sample and compare a new sample with a previous sample. The reflecting surface need not be a patterned surface in the sense of the specially prepared patterns required in the optical mice of the previously mentioned application and patents. For example, surface 14 may be the surface of a desk or other such surface of sufficient reflectivity level to sensitize the detector array. The percentage of reflecting light from surface 14 need not be maximum. The amount of reflecting light need only be sufficient to permit detection of reflected light by the detector elements or cells in detector array 16. Highly reflective surfaces, such as mirror surfaces, are not suitable for the purposes of this invention. There must be some light scattering capabilities due to surface roughness, as an example, a surface roughness on the order of at least onehalf wavelength of the light produced from light source 12.

The detector cells of array 16 are conventionally known in the art and consist of charged nodes which discharge over time via a virtual photodetector when exposed to light. The nodes at the beginning of each sample cycle are recharged to their full value and are discharged toward reference or ground as they are illuminated.

The light from source 12 may be that from a semiconductor laser or light emitting diode as long as there is some coherent emitted light.

It is well known that a speckle pattern is formed by the interference of coherent light scattered from a diffused object. The scattering is caused by the inherent irregularities natural to a surface. The interference caused at such surface will be constructive or destructive. In the case of constructive interference, the light waves will add in intensity while in the case of destructive interference, the light waves will subtract in intensity. This pattern of interference will create light and dark features in the back scattered illumination which is referred to as a speckle pattern.

The speckle pattern reflected from surface 14 scatters back to the detector array 16. At any given observation point on the detector array 16, the intensity of the back scattered light is the sum of all of the light waves reflected from the surface 14 back to this observation point. These waves arrive at the observation point in or out of phase with each other depending on the total path length from the source 12 to the detector array 16 via surface 14. This path length is modified due to the natural roughness or irregularity inherent in reflecting surface 14.

If the illuminated surface 14 moves relative to source 12, the speckle pattern produced by the surface 14 at the detector array 16 moves across the array 16. The speckle pattern not only moves, but transforms since the illuminated surface itself changes due to the translatory motion between the source 12 and surface 14. Thus, a new portion of surface 14 becomes illuminated as an older portion of the surface moves from the view of array 16 and no longer illuminated and, therefore, the speckle pattern changes. As a result, new features consisting of light or dark spots in the speckle pattern come into the view of array 16 as old features depart from view. It is possible to track these features to determine the amount of movement and direction of source 12/array 16 relative to surface 14.

The relationship of the size of the speckle features and their contrast ratio relative to the size of the detector cells in the array 16 depends upon several factors including the roughness or minute irregularity of surface 14 and the extent of coherence of source 12. The speckle pattern features are larger than the size of the individual detector cells. Minimum speckle size at detector array 16 is determined by the formula:

$$\alpha = 2\lambda Z/d$$

where $\alpha$ is the minimum speckle size, $\lambda$ is the wavelength of coherent light of source 12, Z is the distance from reflecting surface 14 to detector array 16 and d is the diameter of the illuminated spot at surface 14. Speckle size should be sufficiently large so as to provide a detectable speckle pattern within the framework of the dimensions of the detector array 16. Required minimum speckle feature size can be accomplished by making the size of the illuminated spot on surface 14 smaller or by making the distance Z larger. The average speckle feature size is generally a little larger than this minimum value.

The contrast ratio is an indication of the contrast between light and dark speckle features which is important since the job of the detector array 16 is detecting moving edges created between these two types of features. The contrast ratio is determined by:

$$C = \frac{I_{max} - I_{min}}{I_{max} + I_{min}}$$

where C is the contrast ratio, $I_{max}$ is the maximum intensity at the array and $I_{min}$ is the minimum intensity at the array.

The contrast ratio will vary according to the coherency of source 12 and the irregularity features of surface 14. The more coherent the source 12, the higher the contrast.

In practice, the surface 14 most likely will be a desk surface which will produce a good speckle pattern. By monitoring the amount of light reflected from surface 14, different levels of reflected intensity can be compensated for at the detector array.

Figure 2:
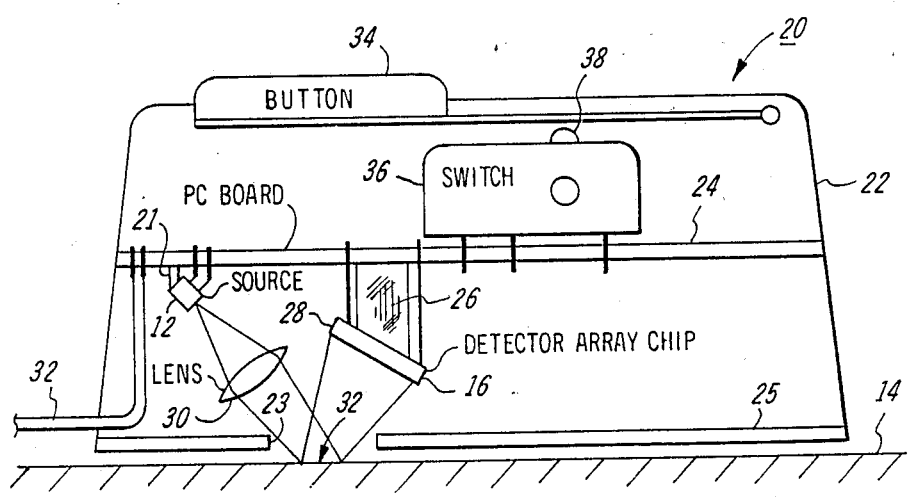
FIG. 2 is a diagrammatic illustration of an optical cursor control device of this invention.

FIG. 2 is a schematic side elevation of a cursor control device or optical mouse 20 of this invention. Mouse 20 comprises a housing 22 which supports a PC board 24 upon which is mounted the structure 26 on the bottom side thereof to support the detector array chip 28. Soruce 12 is also mounted on the bottom side of board 24 by means of support 21. Objective lens 30 focus the coherent light through aperture 23 in bottom plate 25 of housing 22 to a desired spot size 32 on surface 14. Back scattered light reflected from surface 14 at spot 32 is received at the front face of chip 28 which includes the detector array 16. Chip 28 includes the integrated circuitry for detector array 16 including other appropriate circuitry, such as, timing circuitry.

The signal output from mouse 20 to a display system is along cable 32 connected from board 24.

Function switches well known in the cursor control art may be provided in the top of housing 22, each comprising a button 34 operative of a microswitch 36. Finger pressure on button 34 will depress stem 38 of microswitch 36. Microswitch 36 is supported on and electrically connected to PC board 24. The depression of button 34 will activate switch 36 and provide a signal to the display system via cable 32 to initiate a desired system function.

In use, the mouse 20 is moved over surface 14. The light source 12 in mouse 20 illuminates a portion 32 of surface 14 as the mouse is moved over its surface. The light and dark features of the reflected speckle pattern illuminate the surface of detector array 16. As the mouse 20 is moved across surface 14, the speckle pattern, characteristic of source 12, moves with it. By making an intensity trace across the speckle pattern with the detector array 16 and correlating it with a trace taken just prior thereto, the relative motion between the two traces can be determined as well as the direction of its movement.

Two linear arrays of detectors on a single chip may be used or a two dimensional array on a single chip may be used. Examples of detector arrays are charge couple devices (CCD) or a plurality of silicon photodetector cells.

An important aspect is the width of the sample window for the detector array. The sample time must be constant for repeated samples of a speckle intensity pattern having substantially the same contrast ratio in order to provide useful information relative to motion and direction. It is important the time of sample be adjustable. If the time of sample is not adjustable, then the cursor control will be constrained to operate only with reflecting surfaces that provide sufficient photon flux to affect the detector cells during the sample window. However, the sample window must not be so long as to saturate all the detector cells. Therefore, for the detector array to work effectively with surfaces of widely varying reflectivity levels, the sample window of the array must be adjustable to compensate for differences in surface reflectivity levels.

Since the speckle pattern being sampled can, in a sense, be thought as composed of equal mixtures of light and dark features, the sample window can be determined complete when the accumulated photocurrent for half of the detector cells have exceeded a predetermined threshold. This dynamically determined threshold technique will provide a fairly constant sampling window which will automatically change when the reflectivity of the surface being observed changes.

Figure 3A:
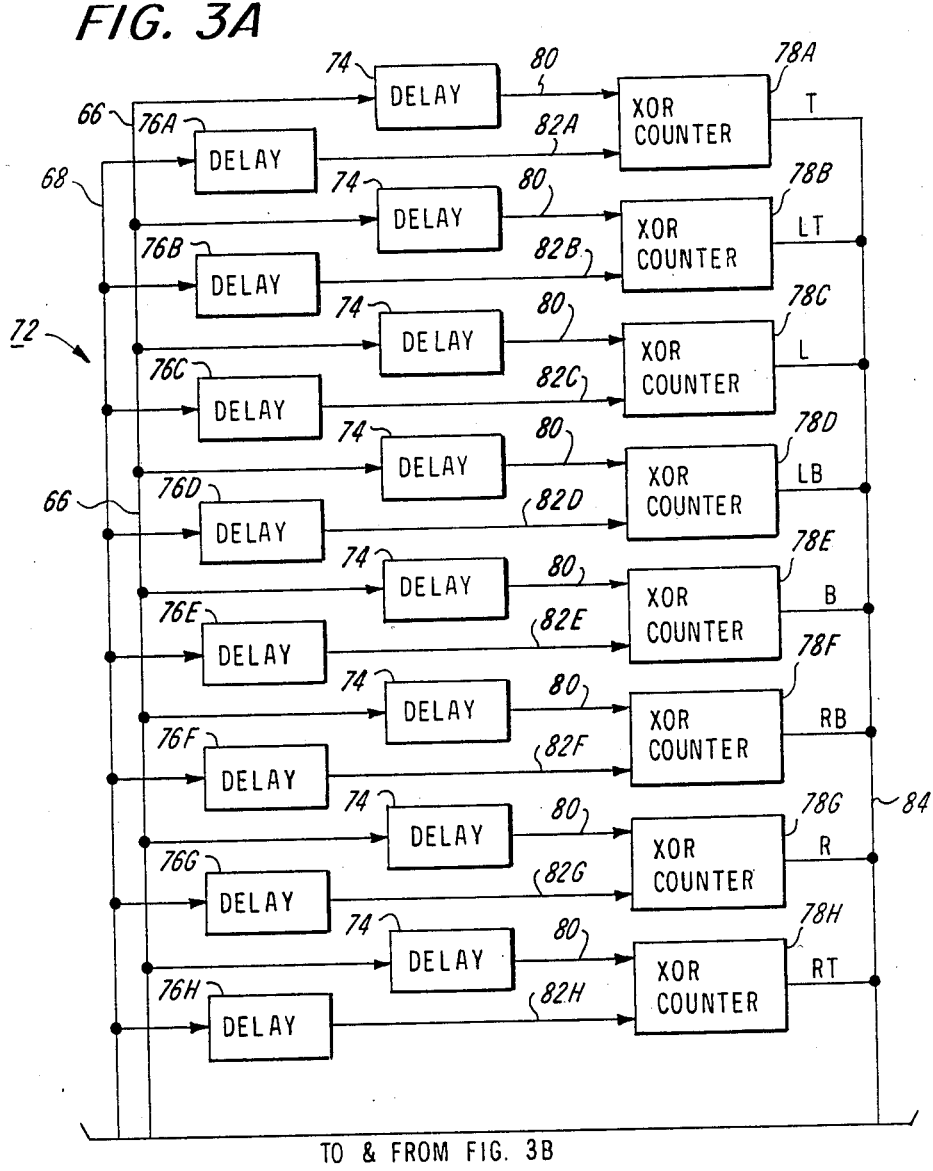
FIGS. 3A and 3B are is a logic diagram of the circuit for processing data signals detected by the detector array chip of the optical cursor control device of this invention.
Figure 3B:
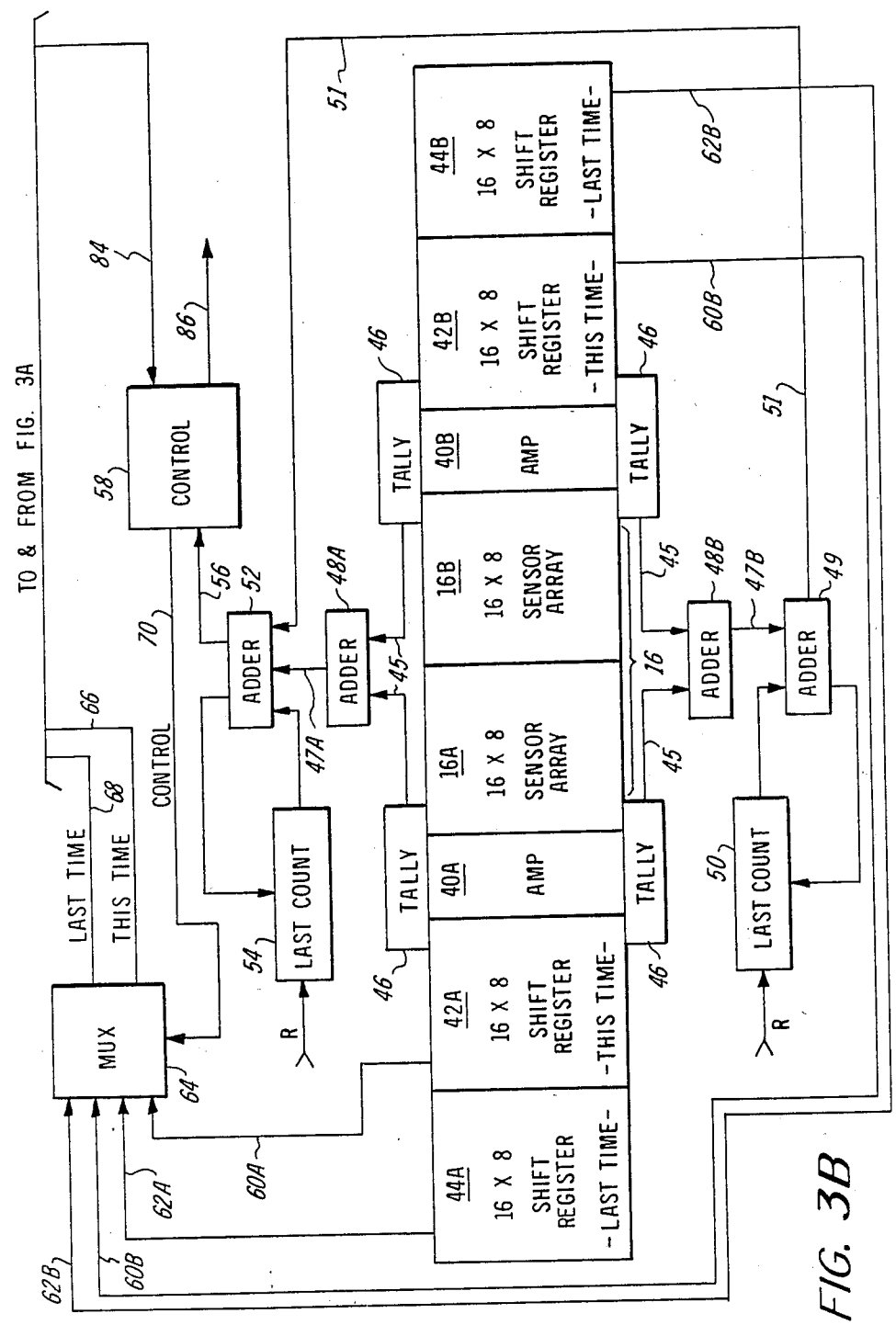

FIGS. 3A and 3B discloses circuit means for carrying out the sample window strategy and motion determination of this invention. For FIG. 3B, detector array 16 is a sixteen by sixteen square array of 256 detector cells. The time to take a total sample must be as short as possible in order to have a practical sampling rate useful for motion detection as a cursor control device. If the sampling window is short in time compared to the time it takes light to discharge the charge present on the nodes of the detector cells, then the total sample acquired during the sample window will be a reasonable representation of the speckle pattern incident on the detector cells.

In order to take advantage of shorter sample windows, the detector array is divided, detection-wise, into two sixteen by eight subarrays 16A and 16B. In this manner, sixteen detector cells in each subarray may be read out in parallel at the same time. It, therefore, takes eight clock periods to read out the entire 256 cell array while three additional clock periods may be sufficient to complete a total tally as to ON cell values for a sample represented by entire array 16. Clock signals for the tally function are provided from control 58. The values are read out in parallel and are amplified in parallel by amplifier circuits 40A and 40B.

A readout of cell values of array 16 is accomplished first to determine the number of cells in the array that have achieved an ON state indicating that they have sensed a sufficient amount of light from the light features present in the speckle pattern. In other words, a determination is made first that the sample obtained from the speckle pattern from reflecting surface 14 is a good or valid sample before the sample is processed to provide information indicative of pattern movement and direction. The amplified values from the array cells are shifted out in groups of eight respectively from the top and bottom half of each subarray 16A and 16B to one of four tally circuits 46. Each tally circuit 46 receives an eight bit group during each clock cycle and provides at its output a binary value equal to the number of cells that are determined from each such group to have obtained an ON state, i.e., the tally circuits 46 produce a binary number representing the number of cells in the subarray whose charge values have decayed beyond threshold and are representative of the cells that have sensed light features in the pattern. The four tally circuits 46 have subtotal tally output values on output lines 45 to the two respective adders 48A and 48B which function to add together the binary numbers from the two respectively inputted to tally circuits 46.

The subtotal tally numbers provided at the respective outputs of adders 48A and 48B are provided respectively to adders 49 and 52. Adder 49 takes the tally from the last clock cycle stored in its last count memory 50 and adds that value to the count provided on line 47B during each clock cycle to provide a new subtotal and this new accumulated value is then stored in memory 50. The same is true relative to adder 52. The value received from adder 48A is added to the value provided in its last count memory 54 to provide a new subtotal representative of the value from adder 48A from the previous clock cycle and this new accumulated value is stored in memory 54.

The value accumulated by adder 49 is also provided to adder 52 via line 51 and is added into the count with the value from adder 48A to provide a new accumulation grand subtotal and this new accumulated count is stored in memory 54 until the tally is completed for an entire sample and a final grand total is achieved.

To be noted is that the values in both last count memories 50 and 54 are reset to zero via their reset lines after a final grand total tally has been achieved.

The adding functions take at least three additional clock cycles and when all 256 cells in the array have been tallied, adder 52 will have a value equal to the total number of detector cells in the array that have achieved an ON state. Thus, adder 52 provides the grand total tally of cells in a given sample that have reached threshold or a predetermined ON state. Two clock periods are required to add the four binary values together via adders 48, 49 and 52 to obtain the binary value representative of a grand total tally.

The grand total value is compared to the binary number 128 representing one half of the detector cells of array 16. This value may be chosen to more or less than half the number of cells in the array. The idea is to obtain a sufficient representation of distinguishable features from the instantaneous speckle pattern that will be useful as a representation of that pattern for comparison with later determined valid sampled patterns. In any case, if the grand total value is equal to or greater than the binary value of 128, then the current sample is deemed valid and is indicated as such by high or "1" on line 56 from adder 52 to control circuit 58 and the values in the array sampled may then be shifted out in parallel groups of sixteen bit values into shift registers 42A and 42B. On the other hand, if the number is less than the binary value of 128, then this particular tallied sample is discarded and another tally is taken from array 16 of the pattern received from the reflecting surface 14.

If a tallied sample is determined to be valid sample in this manner and is shifted out in rows of sixteen parallel cell values with half to shift register 42A and the other half to shift register 42B, the content of values for a previously determined valid sample still present in shift registers 42A and 42B are respectively shifted out in rows of sixteen parallel cell values into shift registers 44A and 44B. In this manner, the values in shift registers 42A and 42B represent the most recent or instant valid sample, termed THIS TIME, and the values in shift registers 44A and 44B represent the immediately past or last valid sample, termed LAST TIME.

Thus, the amplified values or bits are then shifted out in 16 parallel values to 16 by 8 THIS TIME shift registers 42A and 42B until all sixteen cell lines of each subarrays 16A and 16B have been readout and their values stored in THIS TIME registers 42A and 42B. By the same token, the values for a previous valid sample, present in THIS TIME registers 42A and 42B, are shifted out of these registers in parallel into 16 by 8 LAST TIME shift registers 44A and 44B. The sequential shifting of sixteen parallel bit values from subarrays 16A and 16B as well as from THIS TIME registers 42A and 42B to LAST TIME shift registers 44A and 44B is accomplished simultaneously in eight clock periods.

With valid samples achieved, a determination can now be made as to the relative differences or changes between the detected THIS TIME pattern as compared to the detected LAST TIME pattern. The correlation of THIS TIME and LAST TIME data is accomplished by the circuit complex 72 shown in FIG. 3B. The rows of sixteen parallel cell values in registers 42A, 42B and 44A, 44B are sequentially provided, in serial fashion, on lines 60A, 60B, 62A and 62B to multiplexer 64 wherein the values for rows of 16 parallel bits from THIS TIME shift registers 42A and 42B and comparable rows of 16 parallel bits from LAST TIME shift registers 44A and 44B are multiplexed to produce sequentially sixteen serial bit line values respectively for THIS TIME data and LAST TIME data. This data is clocked from multiplexer 64 respectively along THIS TIME line 66 and LAST TIME line 68. The control signals to operate multiplexer 64 are received along control bus 70 from control 58. The main task of control signals on bus 70 is to switch input line pairs 60A and 62A; 60B and 62B to multiplexer 64 from one set of lines to another for bitwise correlation by circuit 72 in a manner as next explained below.

Bitwise autocorrelation embraces the concept of comparing a given bit value for each of the 256 cells in the array with the bit value of neighboring cells surrounding the given cell to determine how many such comparisons are the same and then a count is kept of the number of such comparisons for different groups of identical cell pair comparison.

Figure 4:
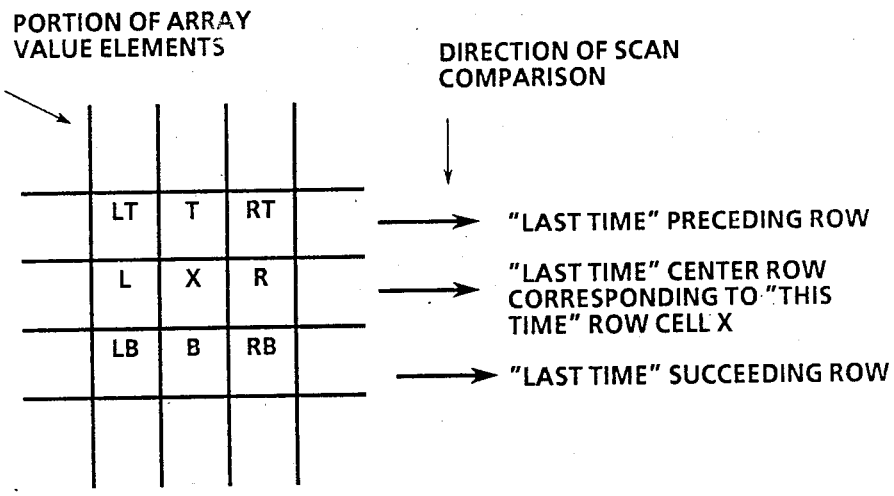
FIG. 4 is a diagrammatic illustration of the comparisons encountered by each array cell during the examination of valid samples produced by the detector array.

As illustrated in FIG. 4, there are eight surrounding neighbors for each given cell X, not counting edge cells of the array. These positions are top (T), left top (LT), left (L), left bottom (LB), bottom (B), right bottom (RB), right (R) and right top (RT). For each cell in the array, a comparison for identical values is made relative to each of those eight adjacent cell positions and the tally of those eight comparisons for each cell position in the array is maintained in a respective counter until the process is complete for an entire sample comparison. This requires eight counters for each of the eight cell pair comparisons to be accomplished. Upon sample completion, the highest value in any one of the eight counters is subtracted from the next highest count value in any one of the eight counters. If the difference is more than a predetermined threshold, then the counter with the highest count is a valid indication of pattern movement with the direction of movement being represented by the counter with the highest number. However, if the highest number and the next highest number in such a sample comparison are the same or are below the predetermined threshold, this is a valid indication of no pattern movement. For example, in FIG. 4, if the count for RT comparisons with X throughout the array is higher than any other such comparison count and the difference between its value and the second highest of such count comparisons for all cells throughout the array exceeds a predetermined threshold, then a valid determination has been made that movement from a LAST TIME pattern to a THIS TIME pattern has been in the direction of X→RT, i.e., in a compassable direction described as from southwest to northeast.

The above described system is, therefore, based upon a preponderance of "votes" determining a direction of movement. The system utilizes the concept of comparing neighboring values from a previous sample with each array cell value in a new sample to determine if they are the same. If any of the eight comparisons provide an indication of being the same, whether a dark feature or a light feature, then there is a possibility that the pattern feature being detected has "moved" to new cell position. An identical cell pair value counts as one point and the appropriate counter representing that pair comparison is incremented. It can be seen, then, that if the preponderance is that a certain majority of light features detected in the speckle pattern presented to the array have moved in a given direction and also a certain majority of dark features have moved in the same given direction, a reliable indication has been derived that the relative motion between the array 16 and the reflecting surface 14 is in the given direction.

The reliability of this correlation method is based upon not only the preponderance of the "votes" but also due to (1) a cancelling effect which is obtained when the total count for equal and opposite comparisons are the same, or nearly the same, so that no weight can be given for movement in that direction, and (2) an elimination of the effect of the disappearance or diminishing of intensity features in the speckle pattern and their subsequent return which is accomplished by comparing the difference between the highest count value obtained upon complete sample comparison which is subtracted from the next highest count value obtained from the sample comparison and determining that the difference is above a predetermined threshold. The threshold value is a number value which is a measure of the confidence that the pattern has moved in the direction indicated by the counter having the highest indicated value. This value may be sufficiently high to provide a reliable level of confidence regardless of the system "noise" due, for example, to thermal and analog processes.

Reference is now made again to FIG. 3A and circuit complex 72. THIS TIME line 66 from mux 64 is connected to a series of eight identical delay circuits 74. LAST TIME line 68 is connected to a series of eight delays 76A-76H which each have different delay period relative to each other and to the delay period of delay circuits 74. The output of delay circuits 74 and delay circuits 76A-76H are connected as inputs to corresponding XOR counters 78A-78H.

Because the delay period is different in each of the delay circuits 76, it is possible to take a given cell bit value from the THIS TIME sample present at all the outputs of delay circuits 74 and compare it with a cell bit value of one of the eight surrounding cell bit values of the LAST TIME sample to determine if they are the same and if so, increment the respective XOR counter 78 and, if not, provide no counter incrementation.

The delay period of delay circuit 76A is such that the cell bit value above or to the top (T) of a cell X under consideration will be presented to XOR counter 78A. Thus, in all cases, XOR counter 78A represents the incremented value for identical value comparisons for cell bit values in the array in the THIS TIME sample as compared to the cell bit values in the array in the LAST TIME sample for cells immediately to the top (T) of each THIS TIME sample cell. This is due to the delay period of cicuit 76A that insures that the value on line 82A is the bit value for the sample cell immediately above that for the sample cell under consideration on line 80 to XOR counter 78A.

The same is true relative to each of the other delay circuits 76B-76H and corresponding XOR counters 78B-78H. The delay period of circuit 76B, for example, is such that the comparison performed at XOR counter 78B is bit value for a cell in the LAST TIME sample positioned to the left and to the top (LT) of the cell in the THIS TIME sample which is under consideration relative to its own bit value. Again, XOR counter 78C represents the incremented sum total comparison of bit values for cells in the LAST TIME sample to the immediate left (L) of each of cells in the THIS TIME sample. These incremented totaled values representing the total number of identical comparisons achieved for each case are presented as outputs on bus 84 to control 58 so that each XOR counter represents the sum total of identical comparisons for each given cell in a THIS TIME sample relative to each of the eight adjacent neighboring cell positions in a LAST TIME sample. XOR counter 78A represents the total for cells to the top (T), XOR counter 78B represents the total for cells diagonally to the left and to the top (LT), XOR counter 78C represents the total for cells to the left (L), XOR counter 78D represents the total for cells diagonally to the left and to the bottom (LB), XOR counter 78E represents the total for cells to the bottom (B), XOR counter 78F represents the total for cells diagonally to the right and to the bottom (RB), XOR counter 78G represents the total for cells to the right (R) and XOR counter 78H represents the total for cells diagonally to the right and to the top (RT).

With reference again to mux 64, an explanation will be made relative to the overall correlation functioning between the THIS TIME sample and the LAST TIME sample relative to each row of sixteen parallel cell values brought through mux 64 for input to the respective delay circuits 74 and 76A-76H. For a given THIS TIME cell value under consideration, the appropriate delay periods for the delay circuits 76A-76H will provide the appropriate neighboring LAST TIME cell value. When comparison for the given cell value has been completed, the next succeeding THIS TIME cell value is presented as an output on lines 80 from delay circuit 74 and the process is repeated for comparison with each appropriate delayed cell value in the respective delay circuits 76A-76H, which also have been shifted to the next succeeding appropriate cell value. In FIG. 4, the cell value marked "X" has been compared with the cell value T in the preceding row of cell values via XOR counted 78A, and with the cell value LT in the preceding row of cell values via XOR counter 78B, and so on. When the succeeding cell value R in the THIS TIME sample becomes the given cell value X via delay circuits 74 by shifting the THIS TIME row of cell values by one bit value, the corresponding bit value for those serial cell value rows in delay circuits 76A–76H are correspondingly shifted to the right (in the direction scan comparison) by one cell value so that the comparison cycle with the eight neighboring positions T, LT, L, LB, B, RB, R and RT may be accomplished via XOR counters 78A–78H. For comparisons in each cycle of a given THIS TIME cell value that proves to be the same, the appropriate XOR counter 78 will be incremented by one.

It should be noted that for cells along the edge of the array 16, comparison with at least three neighboring cells (in the case of array corner cells, five neighboring cells) is not possible because they are nonexisting. In those cases, the assigned values can be made equal to the determined values of cell comparisons at positions that are diametrically opposite to such nonexisting cell positions. This provides a cancellation effect relative these particular situations.

The values from XOR counters 78A–78H are presented to control 58 where the highest value of all eight counter values for a complete sample comparison cycle is subtracted from the next highest counter value from the same cycle and if the difference is over the predetermined threshold, a positive pattern movement has been discerned.

The indication of direction of movement and number of values obtained from consecutively compared samples may be used to develop four digital signals conventionally known in the art for providing pairs of phased pulse trains representing orthogonal information wherein the phase relationship of train pairs is indicative of the direction of movement and the amount of pulses in a train pair is indicative of the amount of movement.

In reality, circuit complex 72 is detecting moving edges based upon light and dark features in the detected speckle pattern, i.e., edges where there are transitions between the same cell bits of two different samples. Each detector cell in the THIS TIME sample is compared with the value of the same detector cell in the LAST TIME sample and determines whether it appears to have moved left or right or has remained the same. If a detector cell indicates that a value between sample cells is the same, this is representative of a possible movement of a pattern edge. If enough comparisons are made, a consensus can be reached that a speckle pattern edge has, in fact, moved.

As previously indicated, the detector array 16 may comprise two orthogonally positioned linear arrays of detectors employed to detect motion in the X and Y coordinates. In such an embodiment, the circuit means to process the values from the detector cells in each orthogonal linear array is imparted to a comparator resulting in a binary output representing the speckle pattern detected by each linear array.

In order to obtain a sample, a first set of linear values representative of the detected speckle pattern are read into a first linear shift register. Then a second set of linear values representative of the detected speckle pattern seen by the array at a subsequent time are read into a second linear shift register. To perform the correlation function, the outputs of each shift register are fed into an exclusive OR gate and a count is maintained of the number of comparative differences that represent a high or "1". This provides one point of the correlation function. In order to obtain the edge effective indicative of movement, the value data in both serial shift registers is recirculated back into each respective shift register but one bit delay is added in the first shift register so that the speckle pattern is shifted by one position. The read out is then repeated through the exclusive OR gate with the second count representing the value of the correlation function for one bit delay of the first set of data. If this second count is substantially bigger than the first count, an indication has been observed of direction of movement. The same type bit delay relative to the data in the second shift register and correlation of the value data through the exclusive OR gate will be determinative of movement in the other direction.

While the invention has been described in conjunction with specific embodiments, it is evident that many alternatives, modifications and various will be apparent to those skilled in the art in light of the foregoing description. Accordingly, it is intended to embrace all such alternatives, modifications and variations as fall within the spirit and scope of the appended claims.

What is claimed is:

1. In an optical translator device that does not require a specific repetitive reflective pattern for operation and capable of providing information indicative of the amount and direction of relative movement between said device and an unpatterned surface having natural surface irregularities positioned relative thereto and comprising a light source having a sufficient degree of coherent radiation to provide a speckle pattern relative to said surface, said source directed toward an area of said surface wherein a portion of the light is reflected from said surface area, said reflected coherent light undergoing optical interference at said surface area due to the irregularity of said surface thereby forming a reflected speckle pattern consisting of light and dark features, a planar array at said device comprising a plurality of photodetector cells and positioned in a path to receive said reflected pattern and to permit said cells to detect said light features, the values of said cells responsive to said light features representative of a sample of said speckle pattern, means to determine the degree of correspondence of the values of adjacently positioned cells in consecutively produced samples, said degree of correspondence indicative of said information, said means to determine comprises means to total the number of identical values achieved between a number of said array cells under consideration in a present sample as compared with neighboring adjacent cells of a previous sample aligned in orthogonal directions and in diagonal directions relative to said cells in said present sample, the highest value of such comparisons representative of the highest value of matches found to occur between adjacently positioned cells in one of said directions indicative of a preponderance as to the direction of speckle pattern movement and indicative of said information.

2. The optical translator device of claim 1 which includes circuit means to determine the number of said photodetector cells in a sample that have detected light features and means to compare said number with a predetermined value indicative of whether a sample is a valid representation of said sample speckle pattern.

3. The optical translator device of claim 2 wherein said means to determine comprises means to total the number of identical values achieved between a number of said array cells in a present sample as compared with neighboring adjacent cells of a previous sample aligned in orthogonal directions and in diagonal directions relative to said cells in said present sample, the highest value of such comparisons representative of the highest value of matches found to occur between adjacently positioned cells in one of said directions indicative of a preponderence as to the direction of speckle pattern movement and indicative of said information.

4. In a cursor control device that does not require a specific repetitive reflective pattern for operation and capable of providing information indicative of the amount and direction of relative movement of said device over a surface such as a desk top or the like having natural surface irregularities and comprising a light source having a sufficient degree of coherent radiation to provide a speckle pattern relative to said surface, said source directed toward an area of said surface wherein a portion of the light is reflected from said surface area, said reflected coherent light undergoing optical interference at said surface area due to the irregularity of said surface thereby forming a reflected speckle pattern consisting of light and dark features, a planar array comprising a plurality of photodetector cells and positioned in a path to receive said reflected pattern and to permit said cells to detect said light features, the values of said cells responsive to said light features representative of a sample of said speckle pattern, means to determine the degree of correspondence in the values of adjacently positioned cells in consecutively produced samples, the accumulated values of adjacently positioned cells that are identical being indicative of said information, said means to determine comprises means to total the number of identical values achieved between a number of said array cells under consideration in a present sample as compared with neighboring adjacent cells of a previous sample aligned in orthogonal directions and in diagonal directions relative to said cells in said present sample, the highest value of such comparisons representative of the highest value of matches found to occur between adjacently positioned cells in one of said directions indicative of a preponderence as to the direction of speckle pattern movement and indicative of said information.

5. The cursor control device of claim 4 which includes circuit means to determine the number of said photodetector cells in a sample that have detected light features and means to compare said number with a predetermined value indicative of whether a sample is a valid representation of said sample speckle pattern.

6. The optical translator device of claim 5 wherein said means to determine comprises means to total the number of identical values achieved between a number of said array cells under consideration in a present sample as compared with neighboring adjacent cells of a previous sample aligned in orthogonal directions and in diagonal directions relative to said cells in said present sample, the highest value of such comparisons representative of the highest value of matches found to occur between adjacently positioned cells in one of said directions indicative of a preponderence as to the direction of speckle pattern movement and indicative of said information.

7. In a cursor control device that does not require a specific repetitive reflective pattern for operation to provide an output indicative of the amount and direction of relative movement of the device over an unpatterned surface having natural surface irregularities, said output utilized for moving a cursor from position to position on a display screen, said cursor device comprising a housing, a light source supported in said housing having a sufficient degree of coherent radiation to provide a speckle pattern relative to said surface and directed toward said surface over which said housing is moved, a detector array comprising a plurality of photodetector cells supported in said housing and positioned to receive light reflected from said surface, said reflected coherent light undergoing optical interference due to the irregularity of said surface thereby forming a reflected speckle pattern consisting of light and dark features, the contrast between said light and dark features being detected by photodetector cells represented by a value from each of said cells above or below a predetermined threshold, and circuit means coupled to said array to process said values from said array of photodetector cells to determine if a sufficient number of said cells have sensed a predetermined amount of light representative of a valid sample and means to determine the degree of correspondence relative to sample cell values obtained from a present sample with adjacent sample cell values obtained from a previous sample, the accumulated corresponding values of said adjacent values that are identical being indicative of the direction of movement of said cursor control device relative to said surface and correspondingly the direction of movement for said cursor on said display screen, said means to determine comprises means to total the number of identical sample values achieved between a number of said array cells under consideration in said present sample as compared with neighboring adjacent cells of said previous sample aligned in orthogonal directions and in diagonal directions relative to said cells in said present sample, the highest value of such comparisons representative of the highest value of matches found to occur between adjacently positioned cells in one of said directions indicative of a preponderence as to the direction of speckle pattern movement and indicative of said information.

8. The cursor control device of claim 7 which includes circuit means to determine the number of said photodetector cells in said present sample that have detected light features and means to compare said number with a predetermined value indicative of whether said present sample is a valid representation of the sample speckle pattern.

9. The cursor control device of claim 8 wherein said means to determine comprises means to total the number of identical sample values achieved between a number of said array cells under consideration in said present sample as compared with neighboring adjacent cells of said previous sample aligned in orthogonal directions and in diagonal directions relative to said cells in said present sample, the highest value of such comparisons representative of the highest value of matches found to occur between adjacently positioned cells in one of said directions indicative of a preponderence as to the direction of speckle pattern movement and indicative of said information.

10. In an optical translator device capable of providing information indicative of the amount and direction of relative movement of said device over a textured surface not requiring a predetermined, repetitive pattern on said surface, such as a desk or the like, comprising a planar two dimensional array positioned in said device having a plurality of photodetector cells and positioned in a path to receive a reflected image from said surface comprising a speckle pattern, said cells being respectively responsive to randomly disposed light and dark features present in said reflected image speckle pattern, means to sample the response from said cells to said image and store a value from each cell representative of a response level either above or below a given threshold to form a sample of said image, means to compare a given cell value from a present sample formed from said array with circumferentially neighboring adjacent cells fo said given cell from a previous sample wherein said previous sample circumferentially neighboring adjacent cells are positionally aligned in both orthogonal directions and diagonal directions relative to said given cell in said present sample, said means to compare a present cell sample to a previous cell sample is continued for a plruality of said given cell values in said present sample and their corresponding circumferentially neighboring adjacent cells in said previous sample, means to total the number of identical values determined between a number of said given cell values from said present sample and respective circumferentially neighboring cell values from said previous sample, the highest total number of said given cell values relative to respective circumferentially neighboring cell values with respect to a particular of said directions indicative of the direction of movement of said device relative to said image.

11. In the optical translator device of claim 10, wherein said surface is illuminated with coherent light and said image comprising a speckle pattern.

12. In the optical translator device of claim 11, wherein said coherent light is a laser beam.

13. In an optical translator device capable of providing information indicative of the amount and direction of relative movement between said device and a surface, said surface not requiring a predetermined, repetitive pattern thereon, but having natural surface irregularities such as a desktop or the like, means to illuminate said surface with radiation and reflect therefrom, said reflected radiation characterized by having a sufficient degree of coherent radiation to cause constructive and destructive interference in said reflected radiation due to said surface irregularities so as to form a reflected speckle pattern consisting of randomly disposed, sharply contrasting light and dark features, a planar array positioned on said device comprising several rows and columns of light detecting cells and aligned in a path to receive at least a portion of said reflected speckle pattern, said array cells being responsive to the light features in said reflected speckle pattern portion, said responsive cells representative of a sample of said reflected speckle pattern portion and means to correlate between consecutively produced speckle pattern samples to determine said information, said means to correlate including means to identify identical matches between individual cells of a first of such samples with adjacent neighboring cells of those individual cells in a second of such samples.

14. In the optical translator device of claim 13 wherein said speckle pattern features are larger than the size of an array cell and the minimum speckle size, a, is determined by $$a = 2\lambda Z/d$$

where $\lambda$ is the wavelength of coherent light of said illumination means, Z is the distance from said surface to said array and di is the diameter of said reflected speckle pattern portion.

15. In the optical translator device of claim 14 wherein said illumination means is a laser beam.

* * * * *